H. R. BOULDIN & R. SHOEMAKER.
ROTARY PULVERIZING AMALGAMATOR.
APPLICATION FILED MAY 21, 1910. RENEWED NOV. 17, 1913.
1,097,162.
Patented May 19, 1914.
2 SHEETS—SHEET 1.
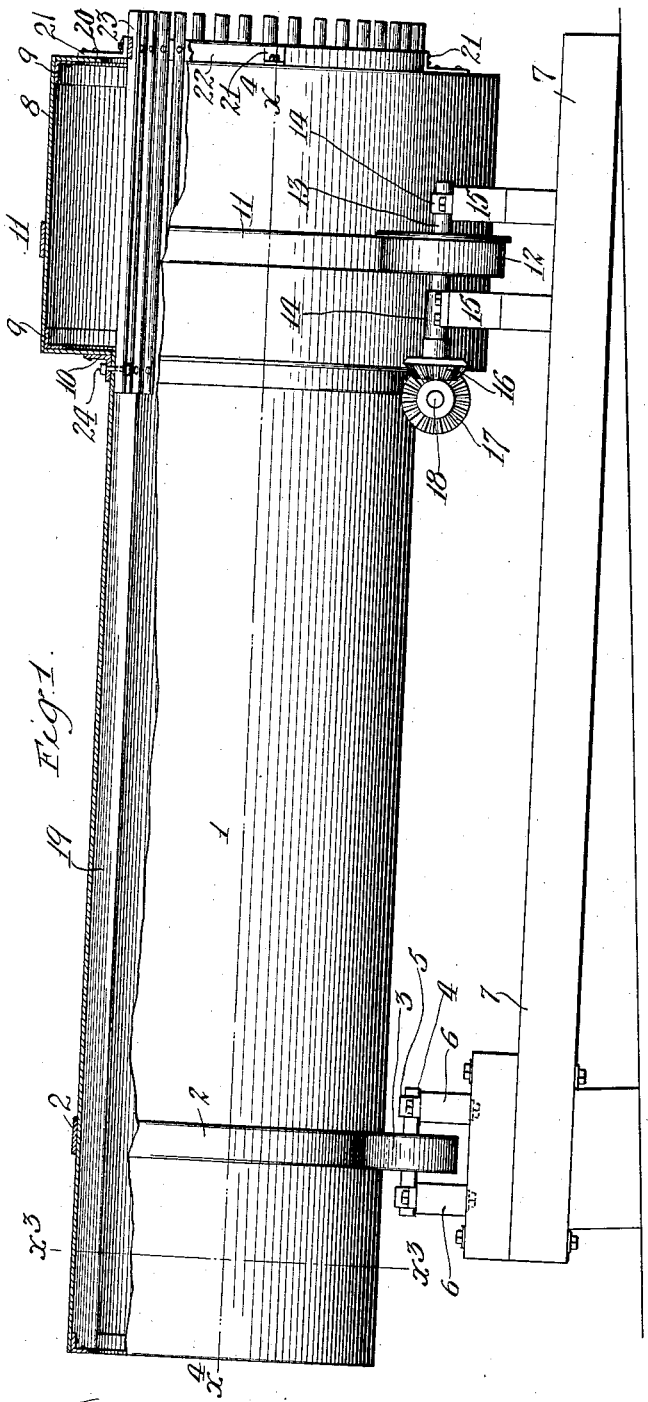
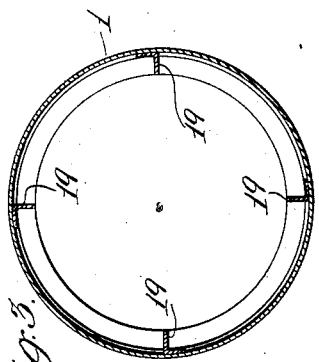
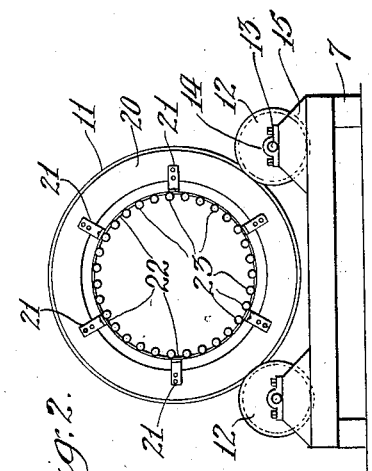

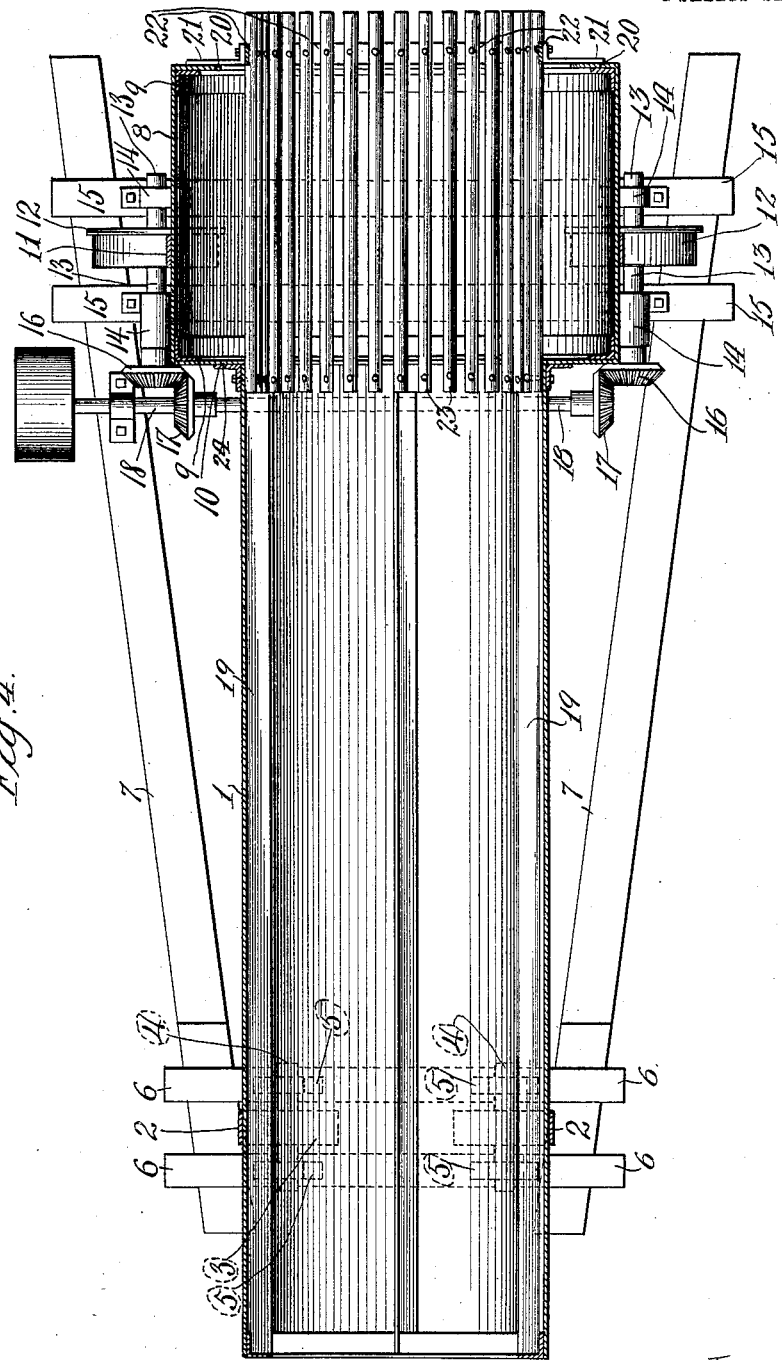

UNITED STATES PATENT OFFICE.

HOMER R. BOULDIN AND RODNEY SHOEMAKER, OF SAN BERNARDINO, CALIFORNIA.

ROTARY PULVERIZING-AMALGAMATOR.

1,097,162.  Specification of Letters Patent.  Patented May 19, 1914.

Application filed May 21, 1910, Serial No. 562,760. Renewed November 17, 1913. Serial No. 801,551.

*To all whom it may concern:*

Be it known that we, HOMER R. BOULDIN and RODNEY SHOEMAKER, both citizens of the United States of America, residing at San Bernardino, in the county of San Bernardino and State of California, have invented a new and useful Rotary Pulverizing-Amalgamator, of which the following is a specification.

This invention relates to pulverizers and amalgamators and has for its object to provide a cylindrical chamber into which the material is fed and in which chamber it is pulverized by tumbling the material by rotating the chamber and providing an amalgamating chamber concentric with the first named chamber and rotating therewith but separated therefrom by a grizzly so that the finer material after passing through the grizzly into the amalgamating chamber is brought into contact with the quicksilver in the amalgamating chamber and is therein brought into intimate contact with the quicksilver by the rotation of the chamber which turns the material over and over and brings it together with the quicksilver.

Referring to the drawings: Figure 1 is a side elevation of the invention with part of the pulverizing chamber and amalgamating chamber broken away. Fig. 2 is a front elevation of the device looking at the lower or discharge end of the machine, the view being on a smaller scale. Fig. 3 is a section on line $x^3-x^3$ Fig. 1. Fig. 4 is a horizontal section on line $x^4-x^4$ Fig. 1.

1 designates the pulverizing chamber which is formed as an elongated cylinder rotatably supported in a longitudinally inclined position. Near its upper end the cylinder 1 is provided with an external reinforcing band or bearing flange 2 which rests upon a pair of idle wheels 3, each supported on a shaft 4 mounted in bearings 5 and the bearings 5 being supported by cross beams 6 which, in turn, rest upon a base 7. At its lower end the chamber 1 unites with an enlarged cylinder providing an amalgamating chamber 8, the latter being braced in the corners by internal annular angle irons 9 and by an external annular angle iron 10. The amalgamating chamber 8 is also provided with an external reinforcing bearing band 11 which rides upon flanged wheels 12, each flanged wheel 12 being mounted on a shaft 13 supported in bearings 14 which, in turn, rest upon cross beams 15, the latter being supported by the bed 7. The two shafts 13 are provided with bevel gears 16 which respectively mesh by bevel gears 17 on a shaft 18, the latter extending across underneath the chamber 1 so that both flanged wheels 12 are driven in unison.

Extending longitudinally of the pulverizing chamber 1 are riffles or ribs 19. As many of these may be employed as desired, but we consider four to be the preferred number. Each riffle or rib 19 extends from the upper end of the chamber 1 to the lower end thereof at the point where it joins the amalgamating chamber. At the lower end of the amalgamating chamber 8 is an inwardly directed flange 20, the inner diameter of which is greater than the diameter of the chamber 1 so as to form an annular discharge slot between this flange and the grizzly and a series of radial brackets 21 are riveted or otherwise secured to the flange 20 and project inwardly therefrom and secured to the brackets 21 is a ring 22.

Extending longitudinally through the amalgamating chamber and arranged in a circle therein and substantially in line with the pulverizing chamber 1 is an annular series of bars 23 which are spaced apart a suitable distance to form a grizzly. The bars 23 are preferably round, as shown, their outer ends being flattened or recessed and bolted to the ring 22, while their upper inner ends are bolted to the inner face of the pulverizing chamber 1 by bolts 24 which pass through the angle iron 10, as well as through the wall of the chamber 1 and the bars 23 are thus securely fastened in position. The grizzly formed by the bars 23 thus provides an annular grizzly which is practically a continuation of the pulverizing chamber 1 and which separates the pulverizing chamber 1 from the amalgamating chamber 8.

In operation, the amalgamating chamber 8 contains a suitable amount of quicksilver and the material to be treated is fed into the upper end of the pulverizing chamber 1 and as the machine rotates the ribs 19 act to pick up the material and raise it up until it slides off from the ribs and falls so that the material is caused to travel from the upper end of the chamber 1 toward the lower end thereof and at the same time the material in dropping becomes pulverized to a greater or less degree. The pulverizing cylinder 1 being operated from the outside, and the flange 19 therein extending only part way toward the center, it follows that the material drops freely from said flanges onto the bottom of the cylinder, giving a maximum blow and pulverizing action for a given height of the cylinder. Upon arriving at the grizzly, those particles which are sufficiently small to pass between the bars 23 enter the amalgamating chamber 8 and come in contact with the quicksilver therein, some of the gold uniting immediately with the quicksilver, while that which does not immediately unite is subsequently brought into union with the quicksilver by the repeated tumbling action which the material containing the gold receives due to the rotation of the amalgamating chamber and to the tumbling action of the material. The quick-silver is retained in the larger cylinder or amalgamating cylinder by the flange 20, and the material which passes through the grizzly is retained in said chamber by said flange for a sufficient length of time to effect the amalgamation, the tailings and waste water spilling over the said flange at the bottom of the amalgamating chamber.

What we claim is:

A rotary pulverizing amalgamator comprising a longitudinally inclined main cylinder providing a pulverizing chamber, an enlarged cylinder providing an amalgamating chamber united with the lower end of the main cylinder, an inwardly directed flange secured to the lower end of the enlarged cylinder and providing an outlet opening of larger diameter than the main cylinder, radial brackets secured to the inwardly directed flange, a ring secured to the radial brackets, an annular series of spaced bars secured to the lower end of the main cylinder and to the ring and providing a grizzly, and supporting and driving means.

In testimony whereof, we have hereunto set our hands at San Bernardino, California, this 12th day of May, 1910.

HOMER R. BOULDIN.
RODNEY SHOEMAKER.

In presence of—
WILLIAM C. SECCOMBE,
HOWARD RINEWALT.

Copies of this patent may be obtained for five cents each, by addressing the "Commissioner of Patents, Washington, D. C."